United States Patent
Fan et al.

(10) Patent No.: US 6,847,522 B2
(45) Date of Patent: Jan. 25, 2005

(54) ELECTRONIC DEVICE WITH AN ADJUSTABLE BACK-SUPPORTING PLATE

(75) Inventors: Cheng-Yuan Fan, Taipei (TW); Yuan-Te Chang, Taipei (TW)

(73) Assignee: First International Computer, Inc., Taipei (TW)

( * ) Notice: Subject to any disclaimer, the term of this patent is extended or adjusted under 35 U.S.C. 154(b) by 0 days.

(21) Appl. No.: 10/846,795

(22) Filed: May 14, 2004

(65) Prior Publication Data

US 2004/0264120 A1 Dec. 30, 2004

(30) Foreign Application Priority Data

Jun. 30, 2003 (TW) ...................................... 92211991 U

(51) Int. Cl.[7] .............................. H05K 5/00; H05K 7/00; G06F 1/16
(52) U.S. Cl. ........................ 361/683; 361/680; 361/681; 361/755
(58) Field of Search ................................ 361/679, 680, 361/681, 682, 683, 686, 755

(56) References Cited

U.S. PATENT DOCUMENTS

| | | | | |
|---|---|---|---|---|
| 5,247,285 A | * | 9/1993 | Yokota et al. ............... | 361/680 |
| 5,666,273 A | * | 9/1997 | Kurcbart ...................... | 361/814 |
| 5,764,474 A | * | 6/1998 | Youens ........................ | 361/680 |
| 5,781,406 A | * | 7/1998 | Hunte .......................... | 361/680 |
| 5,808,922 A | * | 9/1998 | Martinez et al. ............ | 708/141 |
| 5,926,364 A | * | 7/1999 | Karidis ........................ | 361/681 |
| 6,152,550 A | * | 11/2000 | Yamaguchi ............... | 312/223.2 |
| 6,381,125 B1 | * | 4/2002 | Mizoguchi et al. ......... | 361/682 |
| 6,392,873 B1 | * | 5/2002 | Honda ......................... | 361/681 |
| 6,414,841 B1 | * | 7/2002 | Chang ......................... | 361/682 |

* cited by examiner

*Primary Examiner*—Phuong T. Vu
(74) *Attorney, Agent, or Firm*—Frommer Lawrence & Haug LLP; Ronald R. Santucci

(57) ABSTRACT

An electronic device includes a housing that is formed with two fixed positioning members, and a back-supporting plate that is movable forcibly on an upright housing portion of the housing to move two tongues of two movable members along two annular guide slots in the positioning members. Each of the annular guide slots has a plurality of positioning slot portions. Each of the tongues of the movable members is limited to move within a corresponding one of the annular guide slots along a single direction, and is biased into a selected one of the positioning slot portions of the corresponding one of the annular guide slots. As such, the inclination angle of an upright housing portion of the housing relative to a horizontal support surface can be adjusted.

5 Claims, 8 Drawing Sheets

US 6,847,522 B2

ELECTRONIC DEVICE WITH AN ADJUSTABLE BACK-SUPPORTING PLATE

CROSS-REFERENCE TO RELATED APPLICATION

This application claims priority of Taiwanese Application No. 092211991, filed on Jun. 30, 2003.

BACKGROUND OF THE INVENTION

1. Field of the Invention

This invention relates to an electronic device that is provided with back-supporting means, and more particularly to an electronic device that includes an adjustable back-supporting plate which can be operated to change the inclination angle of an upright housing portion of the electronic device relative to a horizontal support surface.

2. Description of the Related Art

Normally, a conventional electronic device, such as an all-in-one computer, has a display screen that is disposed fixedly on an upright housing portion. Such an electronic device is disadvantageous in that the inclination angle of the housing portion and the display screen relative to a horizontal support surface cannot be adjusted, thereby resulting in inconvenience during use.

SUMMARY OF THE INVENTION

The object of this invention is to provide an electronic device that includes an adjustable back-supporting plate which can be operated to change the inclination angle of an upright housing portion of the electronic device relative to a horizontal support surface.

According to this invention, an electronic device includes a housing that is formed with two fixed positioning members, and a back-supporting plate that is movable forcibly on an upright housing portion of the housing to move two tongues of two movable members along two annular guide slots in the positioning members. Each of the annular guide slots has a plurality of positioning slot portions. Each of the tongues of the movable members is limited to move within a corresponding one of the annular guide slots along a single direction, and is biased into a selected one of the positioning slot portions of the corresponding one of the annular guide slots. As such, the inclination angle of an upright housing portion of the housing relative to a horizontal support surface can be adjusted.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
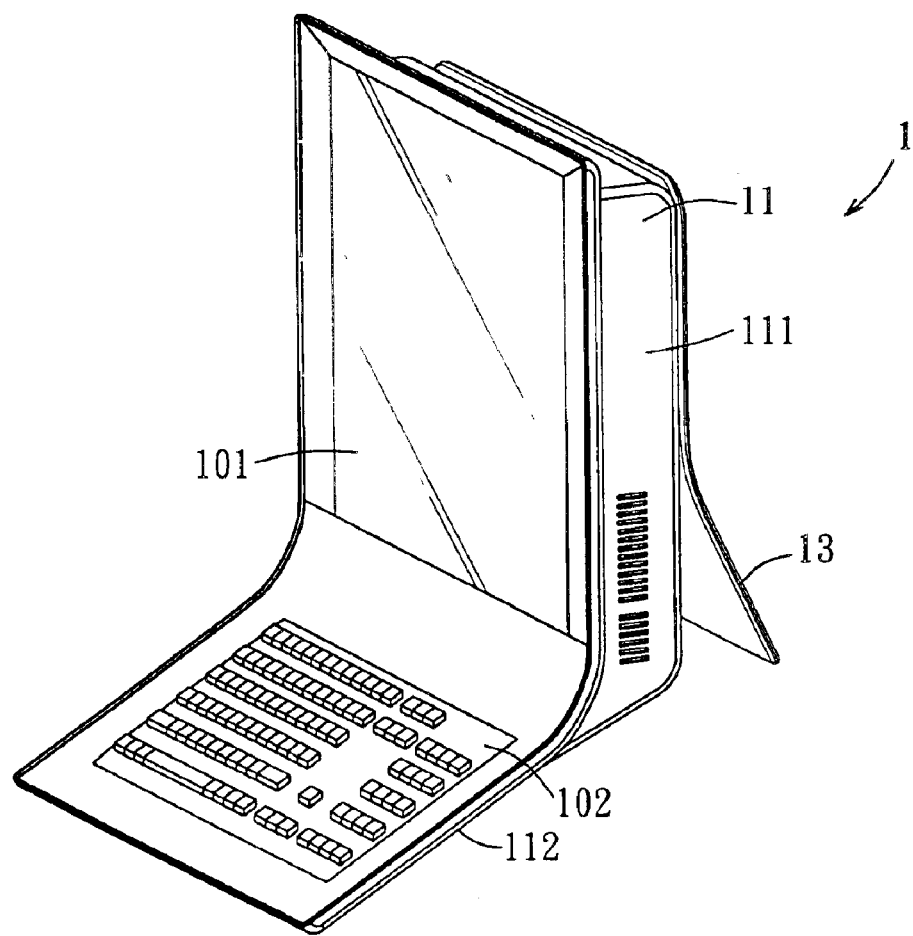
FIG. 1 is an assembled perspective view of the preferred embodiment of an electronic device according to this invention.
Figure 2:
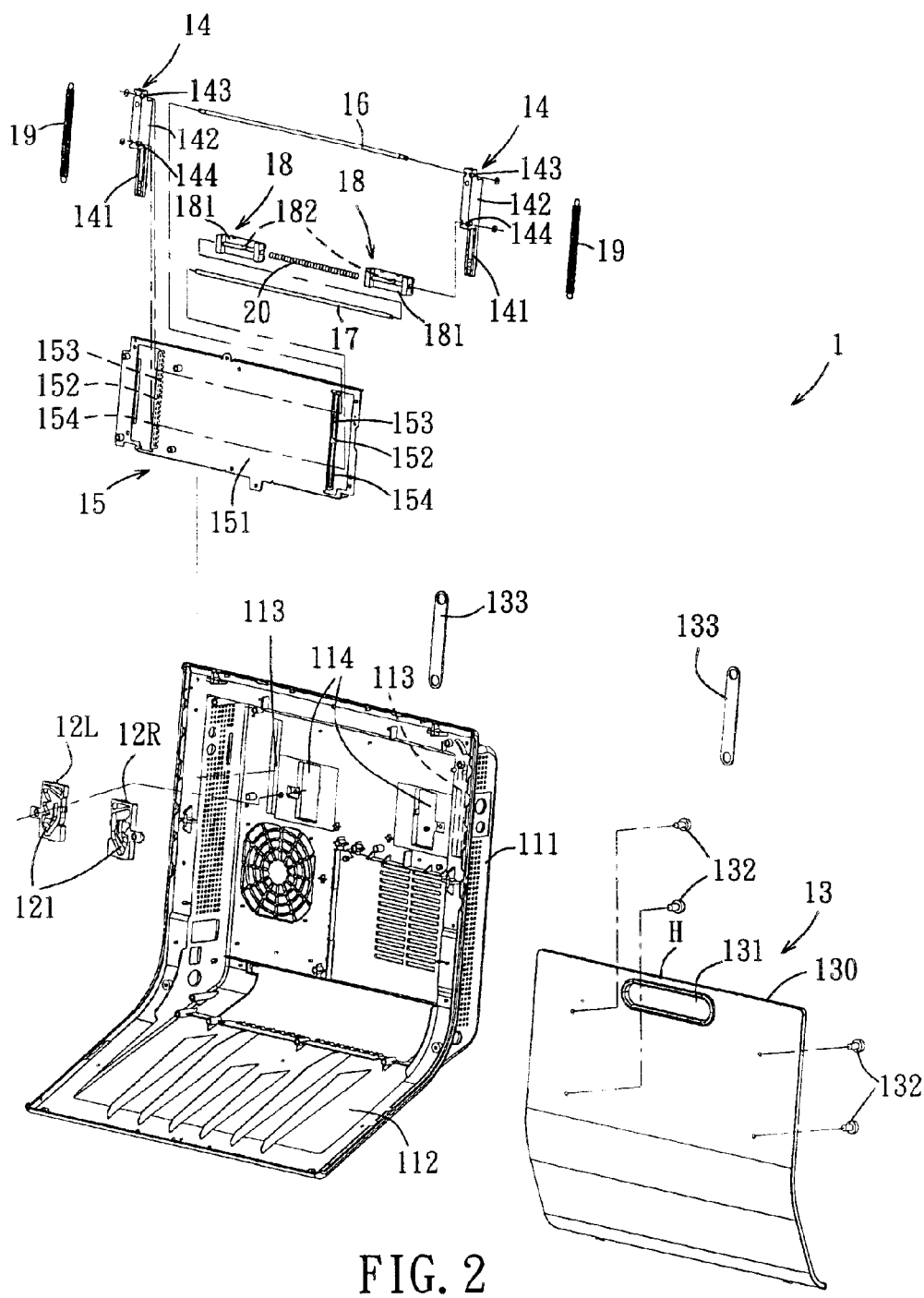
FIG. 2 is a fragmentary, partly exploded perspective view of the preferred embodiment.
Figure 3:
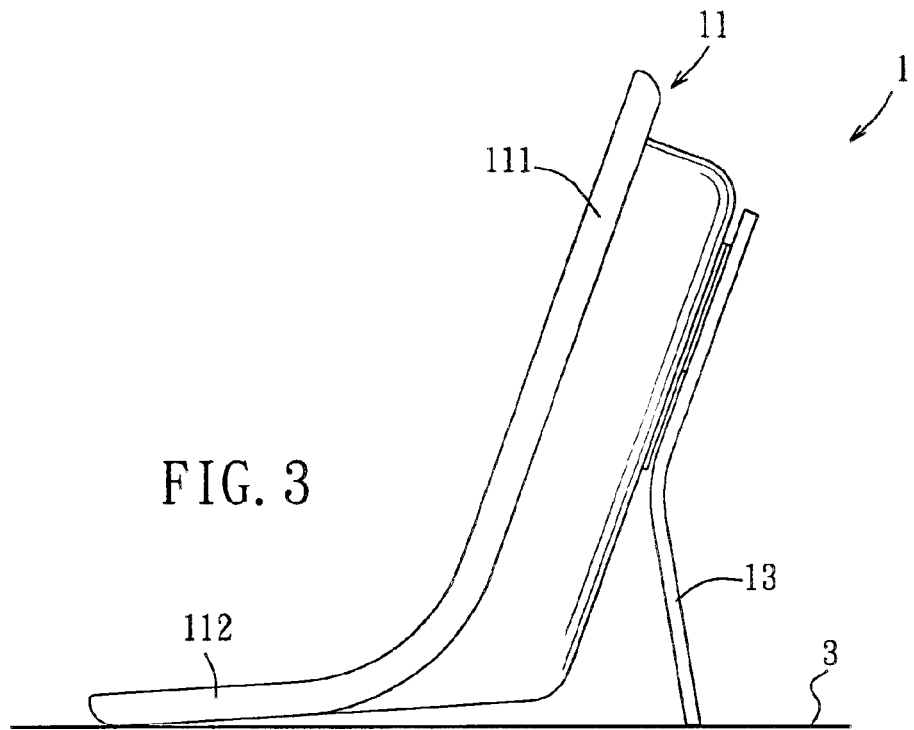
FIG. 3 is a side view of the preferred embodiment, illustrating how the electronic device is placed on a horizontal support surface.
Figures 4, 5:
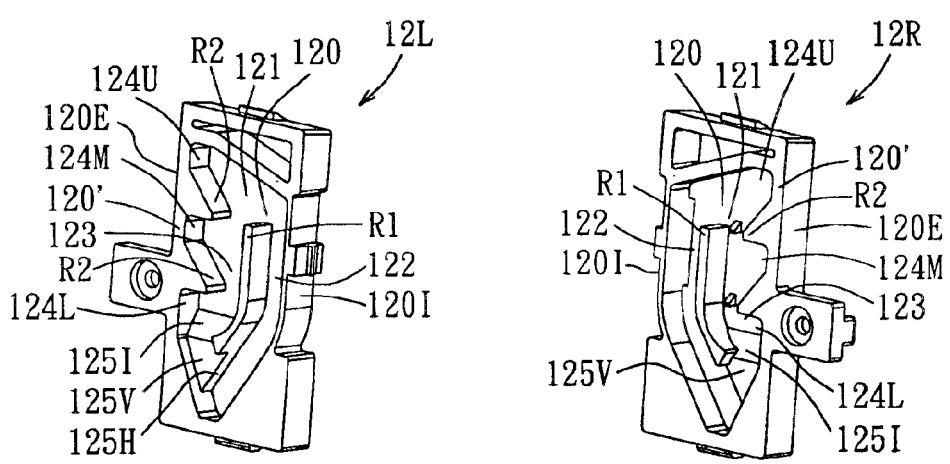
FIG. 4 is a perspective view of a left positioning member of the preferred embodiment.
FIG. 5 is a perspective view of a right positioning member of the preferred embodiment.
Figure 7:
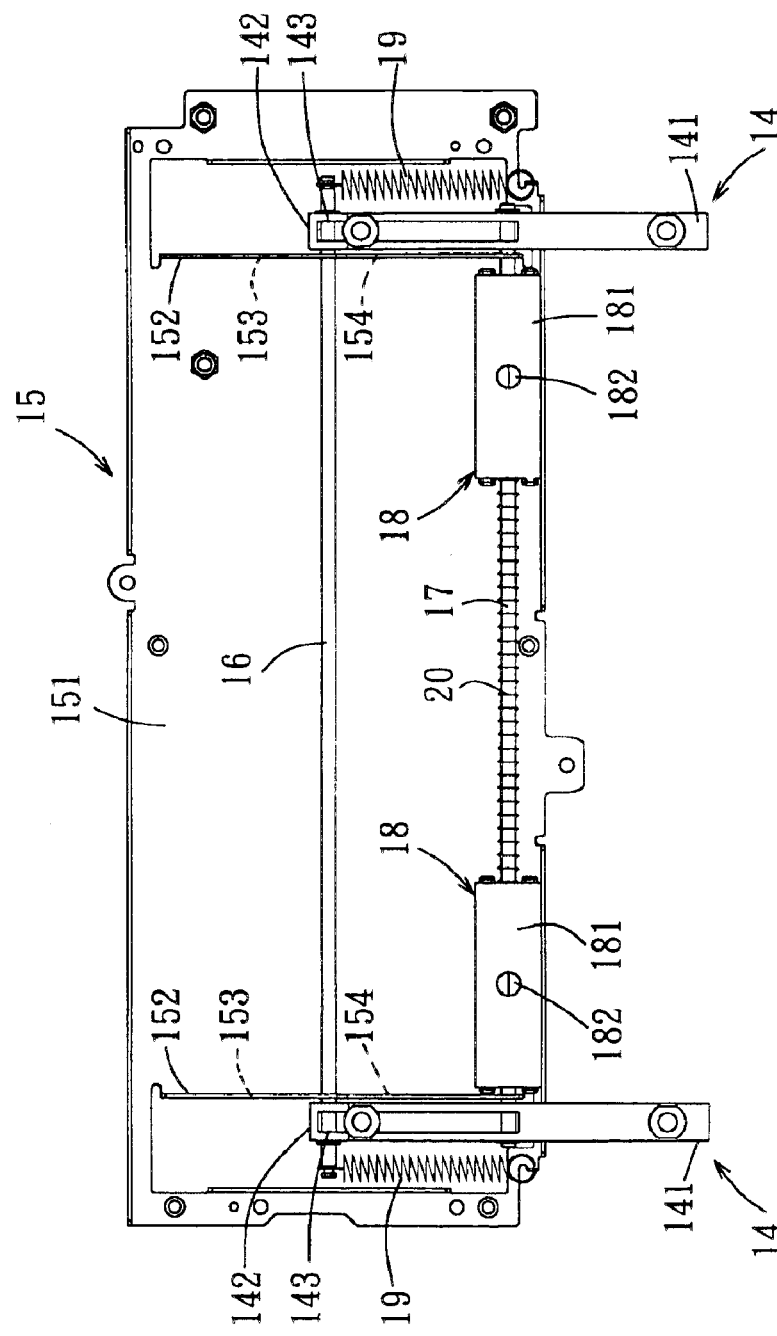
FIG. 7 is a rear view of a mounting member, two sliding members, first and second connecting rods, two movable members, two first biasing members, and a second biasing member of the preferred embodiment.
Figure 6:
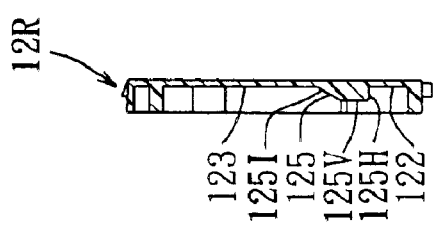
FIG. 6 is a sectional right side view of the right positioning member of the preferred embodiment.

Referring to FIGS. 1, 2, and 3, the preferred embodiment of an electronic device 1 in the form of an all-in-one computer according to this invention is shown to include a computer housing 11, a pair of aligned left and right positioning members (12L, 12R), an upright back-supporting plate 13, two sliding members 14, a mounting member 15, a first connecting rod 16, a second connecting rod 17, two movable members 18, two first biasing members 19, and a second biasing member 20.

The computer housing 11 includes an upright housing portion 111 and a generally horizontal housing portion 112. The generally horizontal housing portion 112 is placed on a horizontal support surface 3 (see FIG. 3). The upright housing portion 111 has a lower end connected fixedly to a rear end of the generally horizontal housing portion 112, two opposite side portions that are formed respectively with two aligned vertical slide slots 113 therethrough, and two recesses 114 formed in a front surface of the upright housing portion 111. A central processing unit (not shown) and a display screen 101 are disposed on the upright housing portion 111. A keyboard 102 is disposed on the generally horizontal housing portion 112.

The left and right positioning members (12L, 12R) are mounted respectively and fixedly within the recesses 114 in the housing 11, and are disposed between and respectively adjacent to the slide slots 113 in the upright housing portion 111.

Referring to FIGS. 2, 4, 5, and 6, each of the left and right positioning members (12L, 12R) has an upright wall 120 that is generally parallel to the front surface of the upright housing portion 111 and that is formed integrally with a divider rib (R1) on a front surface thereof, and a surrounding wall 120' that extends integrally and frontwardly from a periphery of the upright wall 120 to define an annular guide slot 121 between the surrounding wall 120' and the divider rib (R1). As such, each of the left and right positioning members (12L, 12R) is divided by the corresponding divider rib (R1) into an inner slot portion 122 that is defined between an inner side portion (120E) of the corresponding surrounding wall 120' and the corresponding divider rib (R1), and an outer slot portion 123 that is defined between an outer side portion (120E) of the corresponding surrounding wall 120' and the corresponding divider rib (R1). The outer side portion (120E) of the surrounding wall 120' of each of the left and right positioning members (12L, 12R) is formed with two positioning ribs (R2) that are disposed within the corresponding outer slot portion 123 and that extend inwardly toward and that are spaced apart from the corresponding divider rib (R1) so as to define a vertical row of upper, middle, and lower positioning slot portions (124U, 124M, 124L) in the corresponding outer slot portion 123. The inner and outer slot portions 122, 123 of the annular guide slot 121 in each of the left and right positioning members (12L, 12R) have upper ends connected with each other, and lower ends connected with each other. A limiting unit includes two guiding projections 125 that are disposed respectively within the lower ends of the outer slot portions (123) of the annular guide slots 121 in the left and right positioning members (12L, 12R). Each of the guiding projections 125 extends integrally and frontwardly from the upright wall 120 of a corresponding one of the left and right positioning members (12L, 12R), interconnects a lower end of the corresponding divider rib (R1) and the outer side portion (120E) of the corresponding surrounding wall 120', and has a horizontal stop surface (125H), a vertical surface (125V), and an inclined surface (125I). Each of the horizontal stop surfaces (125H) has a rear end connected with a front surface of the corresponding upright wall 120. Each of the vertical surfaces (125V) has a lower end connected with a front end of the corresponding horizontal stop surface (125H). Each of the inclined surfaces (125I) extends upwardly and rearwardly from an upper end of the corresponding vertical surface (125V) to the front surface of the corresponding upright wall 120. Each of the positioning ribs (R2) has an inclined upper side surface 126 (see FIG. 8) and a horizontal lower side surface 127 (see FIG. 8).

Referring to FIGS. 1, 2, 3, 4, 5, 6, 7, and 8, the back-supporting plate 13 has a lower end placed on the horizontal support surface 3, an upper portion abutting against a rear surface of the upright housing portion 111 of the housing 11, a horizontal top side 130, and a horizontal slot 131 formed through the back-supporting plate 13 and adjacent to the top side 130 so as to define a handgrip (H) above the horizontal slot 131. As such, one hand of a person can hold the handgrip (H) for gripping purposes.

Each of the sliding members 14 is configured as a vertical rod, and has a connecting portion 141 connected fixedly to the upper portion of the back-supporting plate 13 by bolts 132 (see FIG. 2) in such a manner that a spacer strip 133 (see FIG. 2) is sandwiched the back-supporting plate 13 and the corresponding sliding member 14, and a sliding portion 142 connected fixedly to the connecting portion 141 and received slidably within a respective one of the slide slots 113 in the upright housing portion 111 of the housing 11. As such, the back-supporting plate 13 can move relative to the upright housing portion 111 of the housing 11.

The mounting member 15 is configured as an upright plate, and has a mounting plate portion 151 generally parallel to the front surface of the upright housing portion 111 of the housing 11, and two connecting plate portions 152 extending respectively, integrally, and rearwardly from two opposite side portions of the mounting plate portion 151 and connected fixedly to the front surface of the upright housing portion 111. Each of the connecting plate portions 152 is formed with a pair of aligned vertical upper and lower slide slots 153, 154.

The first connecting rod 16 is horizontal, extends through the upper slide slots 153 in the connecting plate portions 152 of the mounting member 15, and has two end portions that are connected respectively and fixedly to upper ends 143 of the sliding members 14.

The second connecting rod 17 is also horizontal, extends through the lower slide slots 154 in the connecting plate portions 152 of the mounting member 15, and has two end portions that are connected respectively and fixedly to lower ends 144 of the sliding members 14.

The movable members 18 are sleeved respectively and movably around two end portions of the second connecting rod 17. Each of the movable members 18 has a sleeve body 181 that is sleeved around the second connecting rod 17, and a tongue 182 that is connected fixedly to and that extends rearwardly from the sleeve body 181 and that is received slidably within the annular guide slot 121 in the corresponding one of the left and right positioning members (12L, 12R).

The first biasing members 19 are configured as coiled tension springs that are respectively adjacent to the sliding members 14 and that have upper ends fastened to the first connecting rod 16, and lower ends fastened to the mounting member 15. As such, the first and second connecting rods 16, 17 and the movable members 18 are biased to move downwardly relative to the upright housing portion 111 of the housing 11 and the left and right positioning members (12L, 12R).

Figure 8:
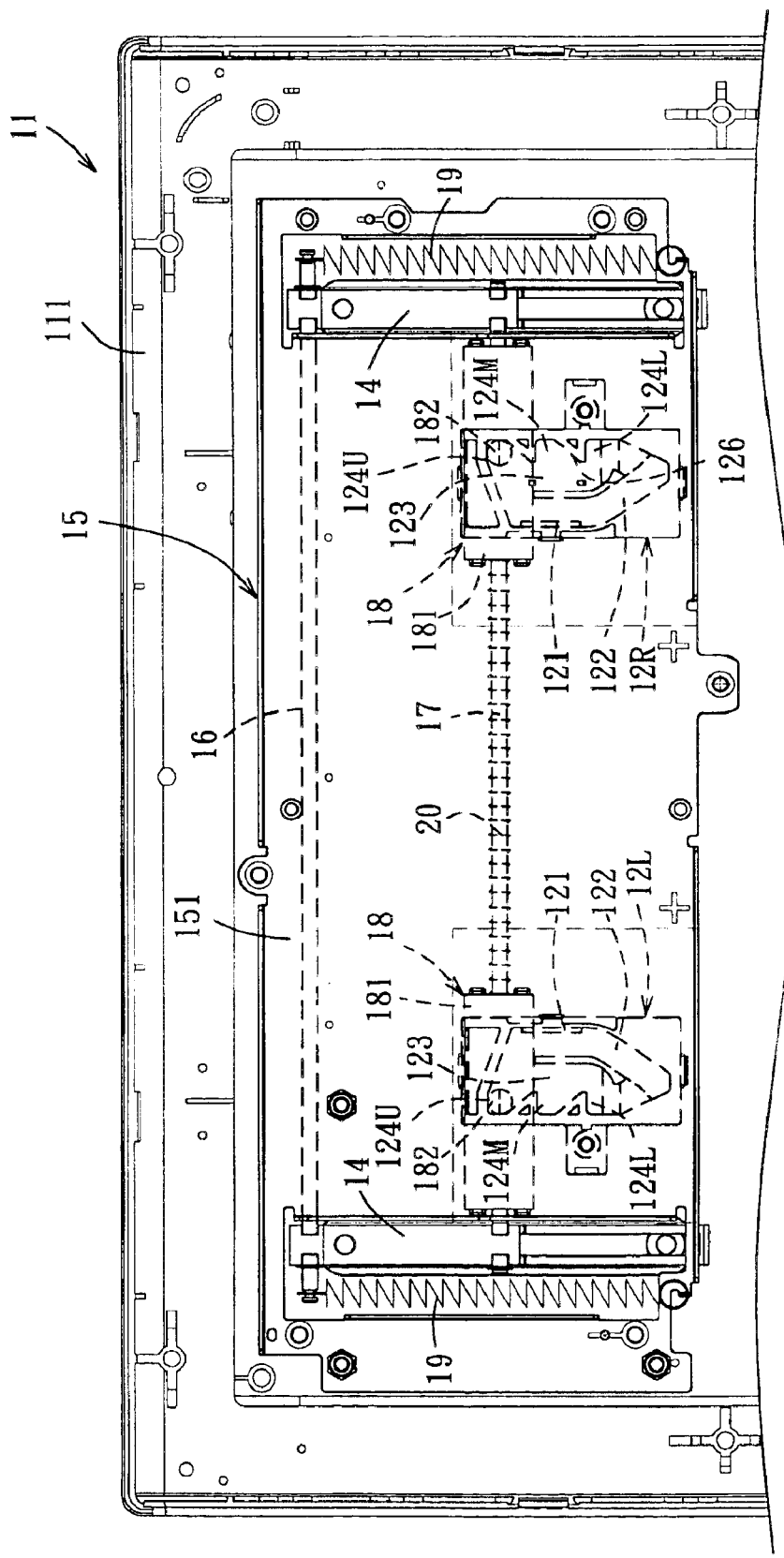
FIG. 8 is a fragmentary front view of the preferred embodiment, illustrating how two tongues of the movable members are positioned at two upper positioning slot portions of two annular guide slots in the left and r-ght positioning members.
Figure 9:
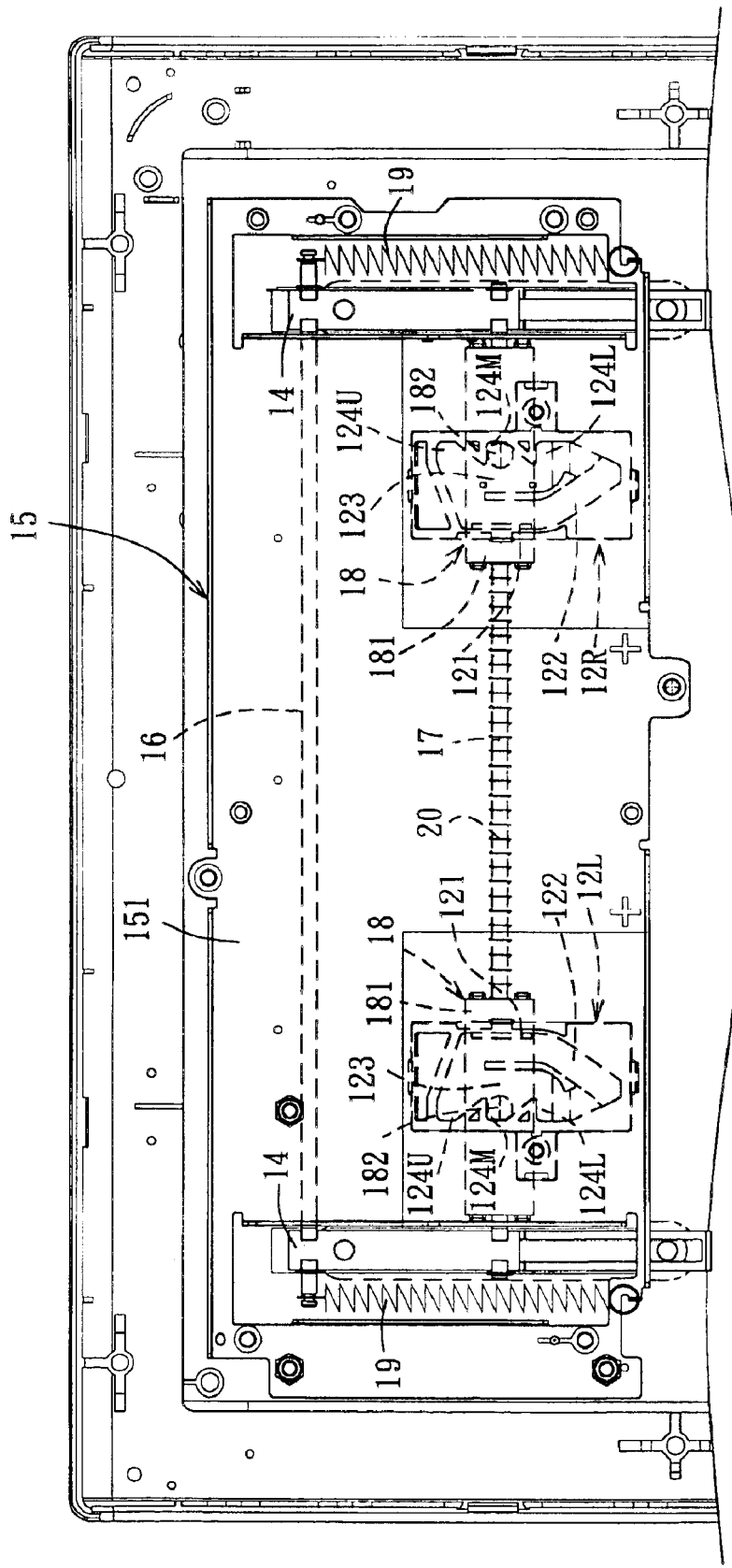
FIG. 9 is a fragmentary front view of the preferred embodiment, illustrating how the tongues of the movable members are positioned at two middle positioning slot portions of the annular guide slots in the left and right positioning members.
Figure 10:
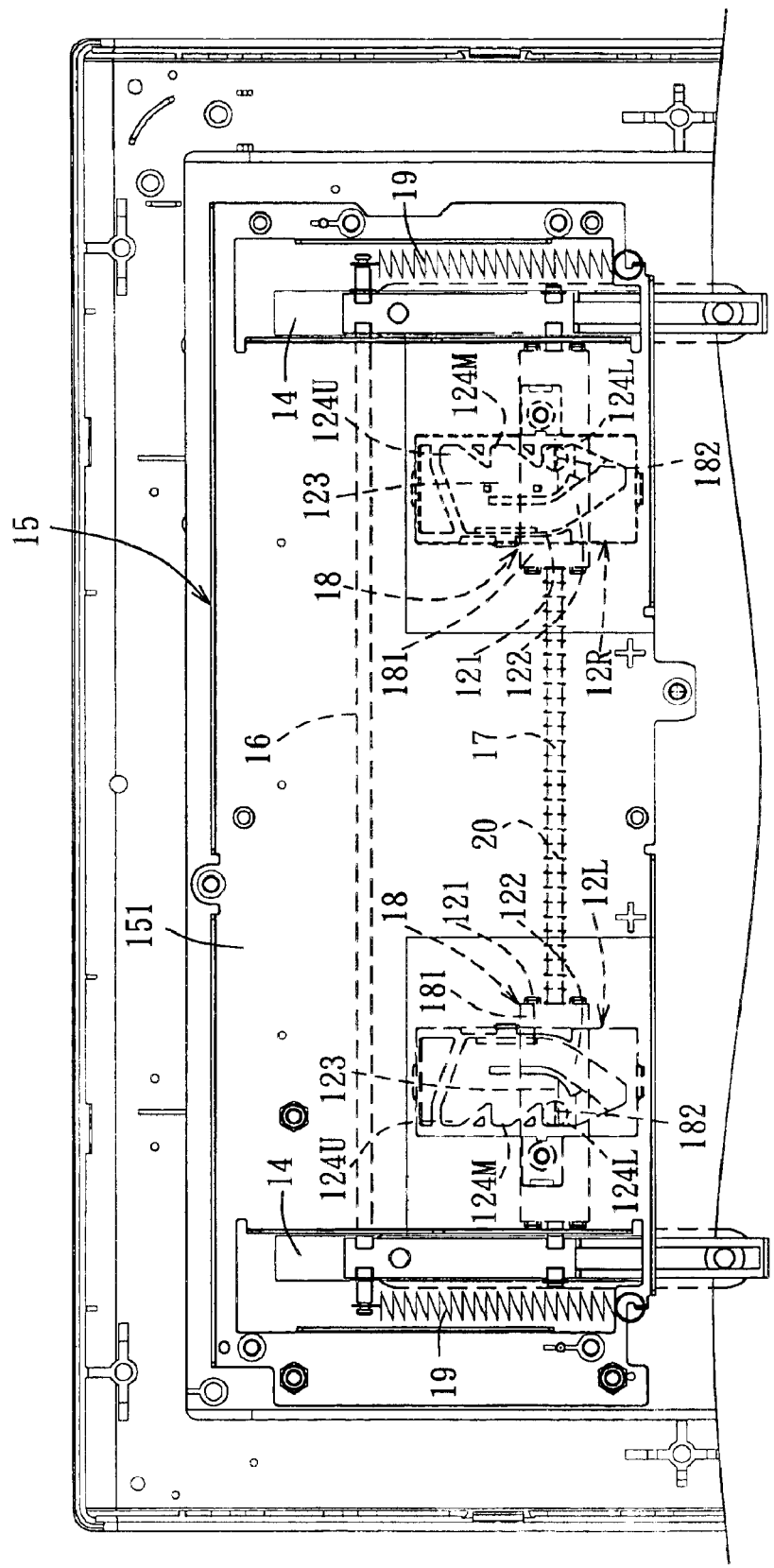
FIG. 10 is a fragmentary front view of the preferred embodiment, illustrating how the tongues of the movable members are positioned at two lower positioning slot portions of the annular guide slots in the left and right positioning members.

The second biasing member 20 is configured as a coiled compression spring that is sleeved around the second connecting rod 19 between the movable members 18 and that has two ends, each of which presses the corresponding movable member 18 against the corresponding sliding member 14. As such, the tongues 182 of the movable members 18 are not able to move from the upper ends of the outer slot portions 123 into the upper ends of the inner slot portions 122, and are able to move from the upper ends of the inner slot portions 122 into the upper ends of the outer slot portions 123. When the tongues 182 are disposed within the outer slot portions 123, they are biased by the second biasing member 20 to move into selected ones of the upper, middle, and lower positioning slot portions (124U, 124M, 124L), as shown in FIGS. 8, 9, and 10.

Because the positioning ribs (R2) have the inclined upper side surfaces 126 and the horizontal lower side surfaces 127, and because the first biasing members 19 bias the movable members 18 to move downward, the tongues 182 are able to move from the upper positioning slot portions (124U) into the middle positioning slot portions (124M) and from the middle positioning slot portions (124M) into the lower positioning slot portions (124L), and are not able to move from the middle positioning slot portion (124M) into the upper positioning slot portion (124U) and from the lower positioning slot portions (124L) into the middle positioning slot portions (124M).

The tongues 182 are able to move from the lower ends of the outer slot portions 123 into the lower ends of the inner slot portions 122 via the guiding projections 125, and are not able to move from the lower ends of the inner slot portions 122 into the lower ends of the outer slot portions 123 via the guiding projections 125.

The back-supporting plate 13 can be forced to move upwardly relative to the upright housing portion 111 of the housing 11 along a direction parallel to the slide slots 113 in the housing 11 so as to move the tongues 182 upwardly along the outer slot portions 123, thereby permitting movement of the tongues 182 from the lower positioning slot portions (124L) into the upper positioning slot portions (124U).

Figure 11:
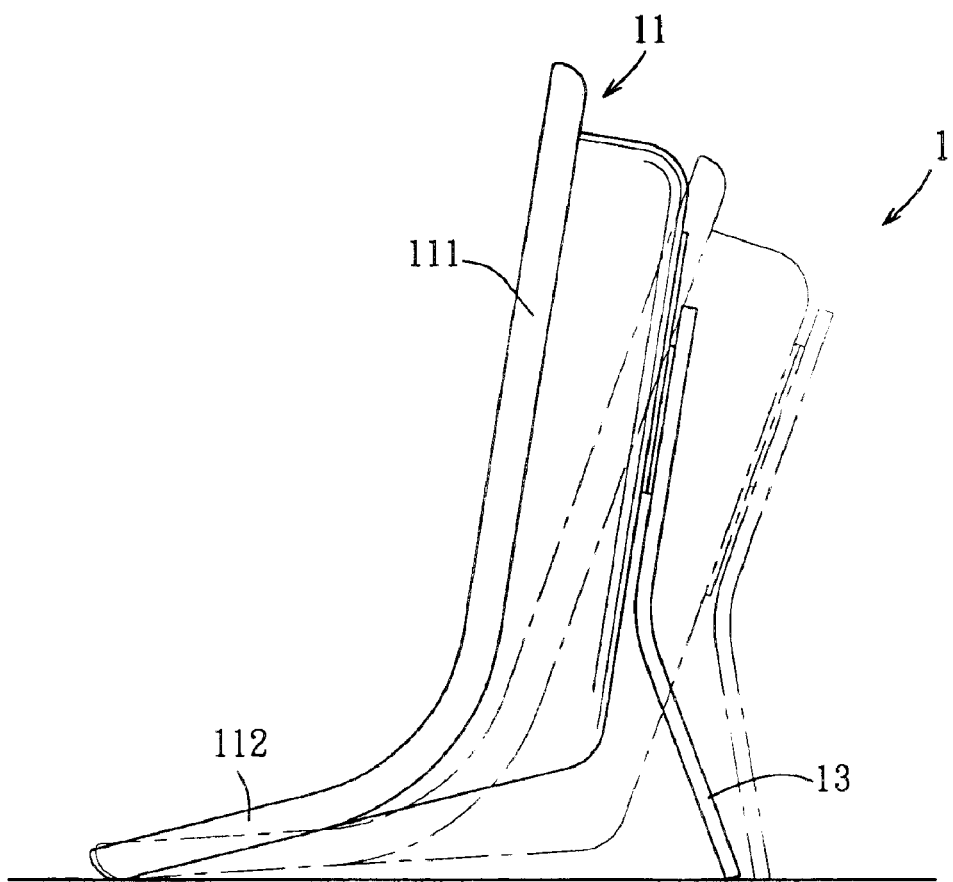
FIG. 11 is a side view of the preferred embodiment, illustrating how the inclination angle of an upright housing portion of a housing relative to the support surface is adjusted.

As such, the tongues 182 can move within the annular guide slots 121 only along a single direction so as to change the inclination angle of the display screen 101 and the upright housing portion 111 of the housing 11 relative to the horizontal support surface 3, as shown in FIG. 11.

With this invention thus explained, it is apparent that numerous modifications and variations can be made without departing from the scope and spirit of this invention. It is therefore intended that this invention be limited only as indicated by the appended claims.

We claim:

1. An electronic device comprising:
    a housing having a generally horizontal housing portion adapted to be placed on a horizontal support surface, and an upright housing portion, said generally horizontal housing portion having a rear end, said upright housing portion having a front surface, a rear surface opposite to said front surface, a lower end connected fixedly to said rear end of said generally horizontal housing portion, and two opposite side portions that are formed respectively with two aligned vertical slide slots therethrough;
    two aligned positioning members mounted fixedly on said front surface of said upright housing portion of said housing and disposed between and respectively adjacent to said slide slots in said upright housing portion of said housing, each of said positioning members having a front surface that is formed with an annular guide slot, an upright divider rib which is formed in said annular guide slot to divide said annular guide slot into an inner slot portion and an outer slot portion, and a plurality of positioning ribs that are disposed within said outer slot portion and that extend inwardly toward and that are spaced apart from said divider rib so as to define a vertical row of positioning slot portions in said outer slot portion, said inner and outer slot portions of each of said positioning members having upper ends connected with each other, and lower ends connected with each other;
    an upright back-supporting plate having a lower end that is adapted to be placed on the horizontal support surface, and an upper portion that abuts against said rear surface of said upright housing portion of said housing;
    two sliding members connected fixedly to said upper portion of said back-supporting plate and received respectively and slidably within said slide slots in said upright housing portion of said housing so as to permit movement of said back-supporting plate relative to said upright housing portion;
    a mounting member mounted fixedly on said front surface of said upright housing portion of said housing;
    a pair of first and second connecting rods, each of which has two ends that are connected respectively and fixedly to said sliding members;
    two movable members sleeved respectively and movably around two end portions of said second connecting rod, each of said movable members having a sleeve body that is sleeved around said second connecting rod, and a tongue that is connected fixedly to and that extends rearwardly from said sleeve body and that is received slidably within said annular guide slot in a corresponding one of said positioning members;
    two first biasing members for biasing said sliding members and said first and second connecting rods to move downwardly relative to said housing;
    a second biasing members for biasing said movable members to press respectively against said sliding members so as to permit movement of said tongues of said movable members from said upper ends of said inner slot portions in said annular guide slots in said positioning members into said upper ends of said outer slot portions in said annular guide slots in said positioning members and so as to prevent movement of said tongues of said movable members from said upper ends of said outer slot portions in said annular guide slots in said positioning members into said upper ends of said inner slot portions in said annular guide slots in said positioning members, thereby biasing said tongue of each of said movable members to move into a selected one of said positioning slot portion of said outer slot portion of said annular guide slot in a corresponding one of said positioning members; and
    a limiting unit for preventing movement of said tongues of said movable members from said lower ends of said inner slot portions of said annular guide slots in said positioning members into said lower ends of said outer slot portions of said annular guide slots in said positioning members while permitting movement of said tongues of said movable members from said lower ends of said outer slot portions of said annular guide slots in said positioning members into said lower ends of said inner slot portions of said annular guide slots in said positioning members;
    whereby, when said back-supporting plate is moved forcibly relative to said housing along a direction parallel to said slide slots in said housing so as to change an inclination angle of said upright housing portion of said housing relative to the horizontal support surface, said tongues of said movable members are limited to move from said upper ends of said inner slot portions of said annular guide slots in said positioning members into said upper ends of said outer slot portions of said annular guide slots in said positioning members, and from said lower ends of said outer slot portions of said annular guide slots in said positioning members into said lower ends of said inner slot portions of said annular guide slots in said positioning members.

2. The electronic device as claimed in claim 1, wherein said sliding members are configured as vertical rods, and have upper ends and lower ends, said first connecting rod having two end portions that are connected respectively and fixedly to said upper ends of said sliding members, said first biasing members being configured as coiled tension springs that are respectively adjacent to said sliding members and that have upper ends fastened to said first connecting rod, and lower ends fastened to said mounting member.

3. The electronic device as claimed in claim 1, wherein said second biasing member is configured as a coiled compression spring that is sleeved around said second connecting rod between said movable members and that has two ends, each of which presses a corresponding one of said movable members against a corresponding one of said sliding members.

4. The electronic device as claimed in claim 1, wherein said back-supporting plate has a horizontal top side, and a horizontal slot formed therethrough and adjacent to said top side so as to define a handgrip above said horizontal slot, whereby, one hand of a person can hold said handgrip.

5. The electronic device as claimed in claim 1, wherein each of said positioning members has an upright wall that is generally parallel to said front surface of said upright housing portion of said housing and that is formed integrally with said divider rib, and a surrounding wall extending integrally and frontwardly from a periphery of said upright wall to define a corresponding one of said annular guide slots between said surrounding wall and said divider rib, said upright wall of each of said positioning members having a front surface, each of said positioning ribs extending inwardly from said surrounding wall and having an inclined upper side surface and a horizontal lower side surface, said limiting unit including two guiding projections that extend respectively and frontwardly from said upright walls of said positioning members and that are disposed respectively within said outer slot portions of said annular guide slots in said positioning members, each of said guiding projections interconnecting a lower end of said divider rib and said surrounding wall of a corresponding one of said positioning members and including a horizontal stop surface having a front end and a rear end that is connected with said front surface of said upright wall of the corresponding one of said positioning members, a vertical surface having an upper end and a lower end that is connected with said front end of said horizontal stop surface, and an inclined surface extending upwardly and rearwardly from an upper end of said vertical surface to said front surface of said upright wall of the corresponding one of said positioning members, whereby, said horizontal stop surfaces of said guiding projections can prevent movement of said tongues of said movable members from said lower ends of said inner slot portions of said annular guide slots in said positioning members into said lower ends of said outer slot portions of said annular guide slots in said positioning members.

* * * * *